(12) United States Patent
Nakajo

(10) Patent No.: US 9,313,844 B2
(45) Date of Patent: Apr. 12, 2016

(54) LIGHTING DEVICE AND LUMINAIRE

(71) Applicant: Panasonic Intellectual Property Management Co., Ltd., Osaka (JP)

(72) Inventor: Akira Nakajo, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/824,676

(22) Filed: Aug. 12, 2015

(65) Prior Publication Data

US 2016/0073457 A1 Mar. 10, 2016

(30) Foreign Application Priority Data

Sep. 10, 2014 (JP) ................. 2014-184407

(51) Int. Cl.
| | | |
|---|---|---|
| H05B 37/02 | (2006.01) |
| H05B 39/04 | (2006.01) |
| H05B 41/36 | (2006.01) |
| H05B 33/08 | (2006.01) |

(52) U.S. Cl.
CPC ........ *H05B 33/0815* (2013.01); *H05B 33/0887* (2013.01)

(58) Field of Classification Search
None
See application file for complete search history.

(56) References Cited

U.S. PATENT DOCUMENTS

| | | | |
|---|---|---|---|
| 8,125,158 B2 | 2/2012 | Nishino et al. | |
| 8,421,360 B2 | 4/2013 | Mishima et al. | |
| 8,581,510 B2 | 11/2013 | Nakada et al. | |
| 8,896,221 B2 | 11/2014 | Esaki et al. | |
| 2010/0109571 A1* | 5/2010 | Nishino et al. | ................ 315/307 |
| 2011/0074310 A1 | 3/2011 | Nakada et al. | |
| 2011/0234104 A1 | 9/2011 | Mishima et al. | |
| 2012/0249003 A1 | 10/2012 | Esaki et al. | |
| 2013/0200707 A1* | 8/2013 | Hartmann et al. | ............... 307/39 |

FOREIGN PATENT DOCUMENTS

| | | |
|---|---|---|
| JP | 2004-254440 A | 9/2004 |
| JP | 2005-071842 A | 3/2005 |
| JP | 2008-187821 A | 8/2008 |
| JP | 2009-054425 A | 3/2009 |
| JP | 2009-100639 A | 5/2009 |
| JP | 2009-100641 A | 5/2009 |
| JP | 2009-158111 A | 7/2009 |
| JP | 2009-201326 A | 9/2009 |
| JP | 2010-033795 A | 2/2010 |
| JP | 2010-140675 A | 6/2010 |
| JP | 2011-048985 A | 3/2011 |

(Continued)

*Primary Examiner* — Anh Tran
(74) *Attorney, Agent, or Firm* — Renner, Otto, Boisselle & Sklar, LLP

(57) ABSTRACT

A lighting device includes: a DC/DC converter including two switching elements connected in series and a resonant circuit connected to a connection point between the two switching elements; and a control unit configured to control driving of the two switching elements. The control unit is configured to: perform intermittent driving in which a switching period and a non-switching period are alternately repeated, the switching period being a period in which the control unit switches ON and OFF the two switching elements respectively and inversely; and the non-switching period being a period in which the control unit stops switching ON and OFF the two switching elements; and provide, in an initial part of the switching period, a frequency gradual decrease period in which a driving frequency for driving the two switching elements is gradually decreased.

12 Claims, 13 Drawing Sheets

(56) References Cited

FOREIGN PATENT DOCUMENTS

| JP | 2011-048986 A | 3/2011 |
| JP | 2011-204611 A | 10/2011 |
| JP | 2012-221599 A | 11/2012 |
| JP | 2012-249363 A | 12/2012 |
| JP | 2014-060131 A | 4/2014 |

* cited by examiner

LIGHTING DEVICE AND LUMINAIRE

CROSS REFERENCE TO RELATED APPLICATION

This application claims the benefit of priority of Japanese Patent Application Number 2014-184407, filed Sep. 10, 2014, the entire content of which is hereby incorporated by reference.

BACKGROUND OF THE INVENTION

1. Field of the Invention

The present disclosure relates to a lighting device which supplies a current to a solid light emitting element, and a luminaire including the lighting device.

2. Description of the Related Art

Known lighting devices that supply a current to a solid light emitting element such as a light emitting diode (LED) include devices equipped with an AC/DC converter and a DC/DC converter connected to the AC/DC converter. These lighting devices are capable of dimming by controlling an output current of the DC/DC converter. Here, in the case where a dimming level is high (that is, the amount of light is small) in a lighting device, a peak current that flows in switching elements included in the DC/DC converter is reduced. In this case, an invalid current that flows in the circuit of the lighting device is increased, which reduces the efficiency of the lighting device. Some lighting devices made in view of this have been proposed (for example, Japanese Unexamined Patent Application Publication No. 2012-221599). The lighting devices are capable of intermittently driving switching elements in a DC/DC converter when a dimming level is high, and thereby performing deep dimming (achieving a high dimming level) while reducing decrease in a peak current that flows in the switching elements.

SUMMARY OF THE INVENTION

However, what is called a ringing phenomenon occurs in the lighting device described in Japanese Unexamined Patent Application Publication No. 2012-221599. The ringing phenomenon is a phenomenon in which a high frequency current occurs in a resonant circuit including switching elements in a period that starts when switching ON and OFF of the switching elements is started and lasts until an output current becomes constant. This causes a problem that a surge current flows in the resonant circuit including the switching elements and stresses circuit components such as the switching elements.

The present disclosure provides a lighting device etc. capable of reducing ringing in a DC/DC converter including a resonant circuit.

A lighting device according to an aspect of the present disclosure includes: a DC/DC converter including two switching elements connected in series and a resonant circuit connected to a connection point between the two switching elements; and a control unit configured to control driving of the two switching elements. The control unit is configured to: perform intermittent driving in which a switching period and a non-switching period are alternately repeated, the switching period being a period in which the control unit switches ON and OFF the two switching elements respectively and inversely; and the non-switching period being a period in which the control unit stops switching ON and OFF the two switching elements; and provide, in an initial part of the switching period, a frequency gradual decrease period in which a driving frequency for driving the two switching elements is gradually decreased.

The lighting device having the above configuration is capable of reducing ringing in the DC/DC converter including the resonant circuit.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENTS

Hereinafter, a lighting device and a luminaire according to aspects of the present disclosure are described in detail with reference to the drawings.

Each of the exemplary embodiments described below shows a general or specific example. The numerical values, constituent elements, the arrangement and connection of the constituent elements, etc. described in the following embodiments are mere examples, and therefore do not limit the scope of the appended Claims and their equivalents. Therefore, among the constituent elements in the following exemplary embodiments, constituent elements not recited in any one of the independent claims which define the most generic concept are described as arbitrary constituent elements.

Each of the diagrams is a schematic diagram, and is not always illustrated precisely. In the diagram, the same numerical references are assigned to substantially the same elements, and the same descriptions are simplified or not repeated below.

Embodiment 1

1-1. Overall Configuration of Lighting Device

First, an overall configuration of lighting device 2 according to Embodiment 1 is described.

Figure 1:
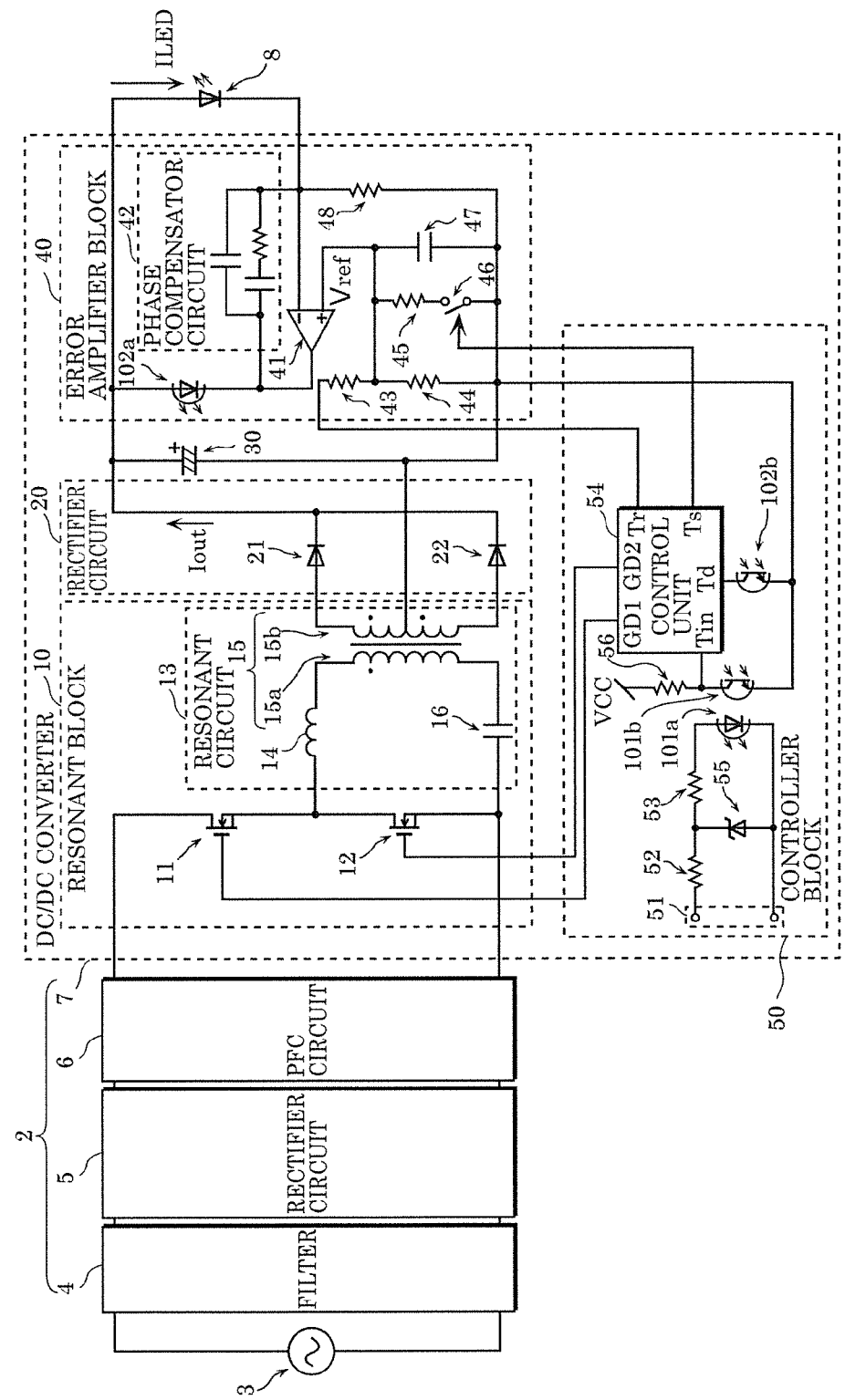
FIG. 1 is a circuit diagram illustrating a circuit configuration of a lighting device according to Embodiment 1.

FIG. 1 is a circuit diagram illustrating a circuit configuration of lighting device 2 according to this embodiment. In the diagram, alternating current 3 (for example, a commercial power source) which generates an alternating voltage to be input to lighting device 2 and light emitting diode (LED) 8 that is an example of a solid light emitting element which receives supply of a current output from lighting device 2.

As illustrated in FIG. 1, lighting device 2 is a device which supplies a current to LED 8, and includes filter 4, rectifier circuit 5, power factor correction (PFC) circuit 6, and DC/DC converter 7.

Filter 4 is a filter which reduces leakage of a high frequency noise to outside lighting device 2. The high frequency noise is a noise generated by DC/DC converter 7 etc. due to a switching operation. Filter 4 used here may be at least one of a common mode filter or a normal mode filter.

Rectifier circuit 5 is a circuit which rectifies an alternating power to be input from filter 4. Rectifier circuit 5 includes, for example, a diode bridge, a smoothing capacitor, and the like.

PFC circuit 6 is a circuit which improves a power factor of lighting device 2 by adjusting a phase of a current to be input from rectifier circuit 5. PFC circuit 6 may be a passive circuit including a capacitor and a coil, or may be an active circuit which includes switching elements etc. and converts an input voltage to a predetermined output voltage.

DC/DC converter 7 is a circuit which converts an output voltage of PFC circuit 6 and applies the resulting voltage to the solid light emitting element. As illustrated in FIG. 1, DC/DC converter 7 includes resonant block 10, rectifier circuit 20, smoothing capacitor 30, error amplifier block 40, and controller block 50.

Resonant block 10 is a circuit which resonates a direct current to be input from PFC circuit 6. As illustrated in FIG. 1, resonant block 10 includes switching elements 11 and 12 connected in series, and resonant circuit 13 connected to the connection point between two switching elements 11 and 12. Switching elements 11 and 12 are elements which switch ON and OFF respectively and inversely under control of controller block 50, and is an n-channel metal oxide semiconductor (NMOS) transistor in this embodiment. Resonant circuit 13 is connected in parallel to the both ends of switching element 12.

Resonant circuit 13 is a circuit which resonates a current to be input to DC/DC converter 7. In this embodiment, as illustrated in FIG. 1, resonant circuit 13 includes electric transformer 15, inductor 14 connected in series to primary coil 15a of electric transformer 15, and resonant capacitor 16 connected in series to primary coil 15a and inductor 14. Rectifier circuit 20 is connected to secondary coil 15b of electric transformer 15. Inductor 14 may be an element separate from electric transformer 15, or may be a leakage component of electric transformer 15.

Rectifier circuit 20 is a circuit which rectifies an alternating current to be output from resonant circuit 13. In this embodiment, as illustrated in FIG. 1, rectifier circuit 20 includes two diodes 21 and 22.

Smoothing capacitor 30 is a capacitor which smoothes a pulsating current of a current rectified by rectifier circuit 20. In this embodiment, smoothing capacitor 30 is an electrolytic capacitor.

Error amplifier block 40 is a circuit which detects a current that flows in LED 8 and controlling the current. In this embodiment, error amplifier block 40 includes error amplifier 41, phase compensator circuit 42, resistors 43, 44, and 48, switching element 46, capacitor 47, and LED 102a. Resistor 48 is a sense resistor which detects a current that flows in LED 8. A voltage drop in resistor 48 corresponds to a current that flows in LED 8. Resistors 43 and 44 are resistors which divide a voltage to be applied from controller block 50. The voltage at the connection point between resistors 43 and 44 is input to a noninverting input terminal of error amplifier 41, as reference voltage Vref. Switching element 46 is an element which adjusts reference voltage Vref to be input to the noninverting input terminal of error amplifier 41. For example, a switching transistor can be used as switching element 46. Resistor 45 is an element which determines reference voltage Vref to be input to the noninverting input terminal when switching element 46 is ON (in an ON state). Capacitor 47 is an element which determines a time constant for adjusting reference voltage Vref to be input to the noninverting input terminal of error amplifier 41 in the case where switching element 46 is switched ON. Error amplifier 41 is an amplifier which compares the voltage drop in resistor 48 corresponding to the current that flows in LED 8 with reference voltage Vref. The inverting input terminal of error amplifier 41 receives an input of a voltage corresponding to the voltage drop in resistor 48. On the other hand, the noninverting input terminal of error amplifier 41 receives an input of reference voltage Vref. Phase compensator circuit 42 is a circuit for performing phase compensation on error amplifier 41, and is connected to the output terminal and the noninverting input terminal of error amplifier 41. LED 102a is an element which is used as a light emitting element of a photocoupler, and emits light to photo transistor 102b which is described later.

Controller block 50 is a circuit for controlling lighting device 2 based on an input signal. As illustrated in FIG. 1, controller block 50 includes signal input unit 51, resistors 52, 53 and 56, Zener diode 55, LED 101a, photo transistors 101b and 102b, and control unit 54. Signal input unit 51 is an input unit for inputting a signal from outside of lighting device 2. In this embodiment, signal input unit 51 receives an input of a dimming signal which is a pulse width modulation (PWM) signal indicating a dimming level. The circuit including resistors 52 and 53 and Zener diode 55 is a circuit for limiting a voltage to be applied to LED 101a. LED 101a and photo transistor 101b make up a photocoupler and serve as a light emitting element and a light receiving element, respectively in the photocoupler. LED 101a emits light to photo transistor 101b. Photo transistor 101b has a collector terminal to which control voltage source VCC is connected via resistor 56. Photo transistor 102b is an element which is used as the light receiving element of the photocoupler, and receives light emitted by LED 102a included in error amplifier block 40.

Control unit 54 is a processing unit for controlling switching elements 11, 12, and 46 based on a signal that is input to signal input unit 51. Control unit 54 includes at least six terminals (terminal GD1, terminal GD2, terminal Tr, terminal Tin, terminal Td, and terminal Ts). Terminals GD1 and GD2 are each a terminal which outputs a signal for driving a corresponding one of switching elements 11 and 12. Terminal Tr is a terminal for applying a voltage corresponding to reference voltage Vref to resistor 43 in error amplifier block 40. Terminal Tin is a terminal which receives a signal corresponding to the signal that is input from signal input unit 51. Terminal Td is a terminal for detecting an error between a current that flows in LED 8 and a target value. Terminal Ts is a terminal which outputs a signal for driving switching element 46. Control unit 54 may be configured with hardware only, or may be implemented by combining hardware and software. Control unit 54 may be implemented, for example, in the form of a micro processor, or the like.

1-2. Ringing Reduction Principle

Next, descriptions are given of a principle of ringing that occurs in a DC/DC converter including an LLC resonant circuit at the time of intermittent driving and a principle of reducing ringing in lighting device 2 according to this embodiment.

In general, in order to cause a complex resonator operation in the DC/DC converter including the LLC resonant circuit such as lighting device 2 according to this embodiment, the switching elements need to be switched ON and OFF alternately at a frequency ranging from first resonance frequency Fr1 to second resonance frequency fs. Here, first resonance frequency Fr1 is a resonance frequency in the case where a load is in a short-circuited state, and second resonance frequency fs is a resonance frequency in the case where a load of the DC/DC converter is in an open state. It is to be noted that first resonance frequency Fr1 and second resonance frequency fs are presented according to the following Expression where Lr denotes an inductance of the resonant circuit included in the DC/DC converter, Lm denotes a magnetizing inductance, and Cr denotes a capacitance.

$$Fr1 = 1/\{2\pi(Lr*Cr)^{-1/2}\} \quad \text{(Expression 1)}$$

$$fs = 1/[2\pi\{(Lr+Lm)*Cr\}^{-1/2}] \quad \text{(Expression 2)}$$

On the other hand, a boundary frequency in a phase advancing operation by the DC/DC converter varies within a range from first resonance frequency Fr1 to second resonance frequency fs according to the state of a load connected to the DC/DC converter. The boundary frequency is second resonance frequency fs in a state where the load is open, and is first resonance frequency Fr1 in a state where the load is short-circuited. As described above, the DC/DC converter tends to perform a phase advancing operation at the switching start time at which the state of the load starts to change transiently. A conceivable case is, for example, a case in which a switching operation of the switching elements is started in a state where the smoothing capacitor connected to the output unit of the DC/DC converter is not charged. In this case, at the moment at which the switching operation is started, the DC/DC converter operates in a mode which is like a state in which the load is short-circuited. In this way, the DC/DC converter behaves as if the boundary frequency in the phase advancing operation is Fr1. Thus, the whole frequency range from fs to Fr1 for a complex resonating operation is a phase advancing area. Accordingly, in the DC/DC converter, ringing occurs at the moment at which the switching operation is started at a frequency in the range from fs to Fr1. Furthermore, ringing occurs each time a switching period starts in the case where intermittent driving is performed in the DC/DC converter. The intermittent driving is driving in which a switching period and a non-switching period are alternately performed. The switching period is a period in which control unit 54 switches ON and OFF the switching elements respectively and inversely, and the non-switching period is a period in which control unit 54 stops switching ON and OFF the switching elements. Accordingly, when intermittent driving is performed, the influence of ringing becomes more noticeable.

In view of this, when performing intermittent driving, DC/DC converter 7 in lighting device 2 according to this embodiment provides a frequency gradual decrease period for gradually decreasing a driving frequency for driving switching elements 11 and 12 in an initial part of the switching period. In this way, DC/DC converter 7 starts an operation from an operation area at a later phase side in the initial part of the switching period. Thus, DC/DC converter 7 is capable of preventing a phase advancing operation. Stated differently, DC/DC converter 7 is capable of preventing ringing from occurring. Furthermore, lighting device 2 switches ON or OFF switching element 46 at a driving frequency no lower than first resonance frequency Fr1 at the start time of the frequency gradual decrease period. In this way, lighting device 2 can prevent a phase advancing operation, and thereby prevent ringing from occurring more reliably. Furthermore, lighting device 2 switches switching element 46 at a driving frequency within the range from first resonance frequency Fr1 to second resonance frequency fs at the end time of the frequency gradual decrease period. In this way, lighting device 2 can perform a complex resonating operation in the period other than the initial part in the switching period.

1-3. Operations

Next, descriptions are given of operations performed by lighting device 2 according to this embodiment.

First, upon a dimming signal comprising a PWM signal is input to signal input unit 51 of controller block 50, the PWM signal is input to terminal Tin of control unit 54 via LED 101a and photo transistor 101b which makes up a photocoupler. Control unit 54 determines a driving frequency for driving switching elements 11 and 12 based on the PWM signal which indicates a dimming level. Here, a driving frequency is a frequency for alternately repeating (i) switching ON switching element 11 and switching OFF switching element 12, and (ii) switching OFF switching element 11 and switching ON switching element 12. In this embodiment, the driving frequency corresponds to a current that is supplied to LED 8. In other words, a lower driving frequency indicates that a larger current is supplied to LED 8, and that a higher driving frequency indicates that a smaller current is supplied to LED 8. In lighting device 2 according to this embodiment, the driving frequency is, for example, approximately 40 kHz when the amount of output light is 100% (that is, the maximum amount of light is output). In this embodiment, a current that flows in LED 8 is subject to feedback control as will be described later. Thus, for example, an initial driving frequency may be set so that a current to be supplied to LED 8 is sufficiently small.

Next, in order to achieve the driving frequencies determined above, control unit 54 outputs signals which vary depending on the driving frequencies, from terminal GD1 and terminal GD2 to the gates of switching elements 11 and 12. Here, control unit 54 switches ON and OFF switching elements 11 and 12 respectively and inversely. In this way, in the case where control unit 54 switches ON switching element 11 and switches OFF switching element 12, a current flows from switching element 11 to inductor 14. In the opposite case where control unit 54 switches OFF switching element 11 and switches ON switching element 12, energy accumulated in inductor 14 etc. while switching element 11 is ON is emitted, and thus a current flows from inductor 14 to switching element 12. Accordingly, an alternating current flows into resonant circuit 13.

The alternating current flowing in resonant circuit 13 flows into secondary coil 15b of electric transformer 15, and is rectified by rectifier circuit 20.

A direct current obtained through the rectification by rectifier circuit 20 is smoothed by smoothing capacitor 30, and is supplied to LED 8.

The current supplied to LED 8 is subject to the feedback control by control unit 54 etc. as indicated below. The current supplied to LED 8 is detected as a voltage drop in resistor 48. The inverting input terminal of error amplifier 41 receives an input of a voltage corresponding to the voltage drop. On the other hand, the noninverting input terminal of error amplifier 41 receives an input of reference voltage Vref. Reference voltage Vref is a voltage determined based on a dimming signal. Reference voltage Vref is generated by means of the voltage output from terminal Tr of control unit 54 being divided by resistors 43 and 44 etc. When a voltage is input to the input terminal of error amplifier 41 in this way, a current corresponding to the error flows into LED 102a connected to the output terminal of error amplifier 41. In this way, the resistance of photo transistor 102b which makes up the photocoupler with LED 102a varies, and the current corresponding to the error is obtained from terminal Td. Control unit 54 detects the current applied from terminal Td, and adjusts the driving frequency for driving switching elements 11 and 12 in order to reduce the error. Through the operations as described above, the feedback control is performed such that the current to be supplied to LED 8 is the current determined based on the dimming signal.

Furthermore, lighting device 2 according to this embodiment adjusts reference voltage Vref to be input to error amplifier 41, and thereby driving switching elements 11 and 12 intermittently. In other words, lighting device 2 according to this embodiment performs intermittent driving in which a switching period and a non-switching period are repeated alternately. The switching period is a period in which control unit 54 switches ON and OFF switching elements 11 and 12 respectively and inversely, and the non-switching period is a period in which control unit 54 stops switching ON and OFF switching elements 11 and 12. Lighting device 2 according to this embodiment provides a frequency gradual decrease period for gradually decreasing a driving frequency for driving switching elements 11 and 12 in the initial part of the switching period in order to reduce ringing in the initial part of the switching period. Hereinafter, the intermittent driving is described with reference to FIG. 2.

Figure 2:
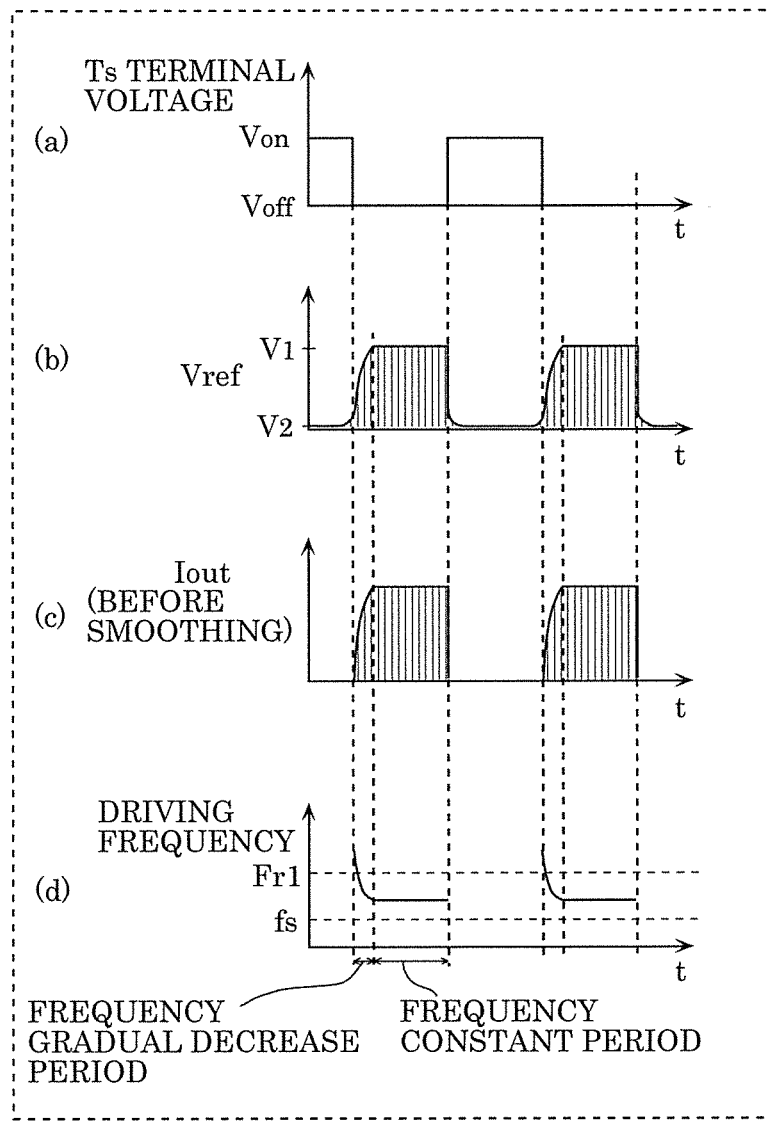
FIG. 2 illustrates graphs each showing a temporal waveform of a voltage etc. in each of units of the lighting device according to Embodiment 1.

FIG. 2 illustrates graphs each showing a temporal waveform of a voltage etc. in each of units of lighting device 2 according to this embodiment.

As shown in graph (a) of FIG. 2, control unit 54 switches a voltage to be applied to switching element 46 from terminal Ts between Von and Voff alternately, so as to cause switching element 46 to be in an ON state (conductive state) and in an OFF state (nonconductive state) alternately. Here, when control unit 54 switches switching element 46 from OFF to ON, resistor 45 is connected in parallel to resistor 44, and a voltage to be applied to resistor 44 decreases. This decreases potentials at the connection points of resistors 43 and 44. Stated differently, reference voltage Vref to be input to the noninverting input terminal of error amplifier 41 decreases. In addition, when control unit 54 switches switching element 46 from OFF to ON, the charges accumulated while switching element 46 is in the OFF state is partly emitted according to a time constant corresponding to the capacitance of capacitor 47. For this reason, when control unit 54 switches switching element 46 from OFF to ON, reference voltage Vref gradually increases from V2 to V1 as shown in graph (b) of FIG. 2 according to the predetermined time constant. Here, a resistor having a sufficiently small resistance is selected as resistor 45. With this, reference voltage Vref in the case where switching element 46 is ON can be sufficiently small voltage V2.

When reference voltage Vref is sufficiently small voltage V2, control unit 54 performs feedback control on the driving frequency for driving switching elements 11 and 12, so that no current flows in resonant circuit 13. When reference voltage Vref is sufficiently small, control unit 54 stops switching ON and OFF switching elements 11 and 12. This makes, to be zero, current Iout that is output from rectifier circuit 20 as shown in graph (c) of FIG. 2 (current Iout is a current before being smoothed by smoothing capacitor 30).

When reference voltage Vref is voltage V1 larger than voltage V2, control unit 54 performs feedback control on the driving frequency for driving switching elements 11 and 12 so as to equalize a voltage drop in resistor 48 due to current ILED that flows in LED 8 and voltage V2. In this way, current Iout output from rectifier circuit 20 varies as shown in graph (c) of FIG. 2.

As described above, lighting device 2 according to this embodiment drives switching elements 11 and 12 intermittently. In lighting device 2 according to this embodiment, an intermittent frequency which is a frequency for the intermittent driving is set to, for example, a frequency in a range from 50 Hz to 1 kHz.

Furthermore, in lighting device 2 according to this embodiment, reference voltage Vref is gradually increased from voltage V2 to voltage V1 as described above. Accompanied by this, control unit 54 performs feedback control on the driving frequency for switching elements 11 and 12. Thus, as shown in graph (d) of FIG. 2, the driving frequency gradually decreases. Here, the driving frequency gradually decreases from a frequency higher than or equal to first resonance frequency Fr1 to a frequency in a range from first resonance frequency Fr1 to second resonance frequency fs over the frequency gradual decrease period. Subsequently, the driving frequency is maintained at an approximately constant level corresponding to the range from first resonance frequency Fr1 to second resonance frequency fs, over a frequency constant period that lasts until the switching period ends. Here, the length of the frequency gradual decrease period is not particularly limited. The length may be determined based on properties of each of elements, such as the capacitance etc. of smoothing capacitor 30.

With reference to the drawing, descriptions are given of a current that flows in each of switching elements 11 and 12 in the case where control unit 54 switches ON and OFF switching elements 11 and 12 respectively and inversely at a driving frequency no lower than first resonance frequency Fr1 so that no ringing occurs in lighting device 2 according to this embodiment.

Figure 3:
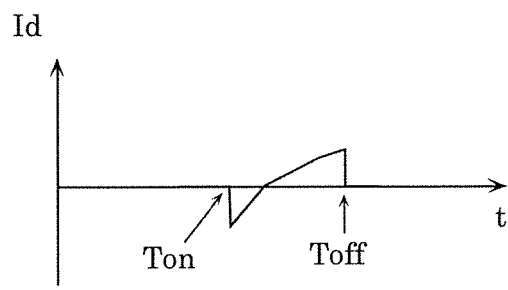
FIG. 3 illustrates a graph showing a temporal waveform of a current that flows in the switching elements when a switching period is started in the lighting device according to Embodiment 1.

FIG. 3 is a graph showing an exemplary temporal waveform of a current that flows in switching elements 11 and 12 at the start time of the switching period, in lighting device 2 according to this embodiment. At each of time points Ton and Toff shown in FIG. 3, control unit 54 switches ON and OFF switching elements 11 and 12 respectively and inversely.

Figure 4:
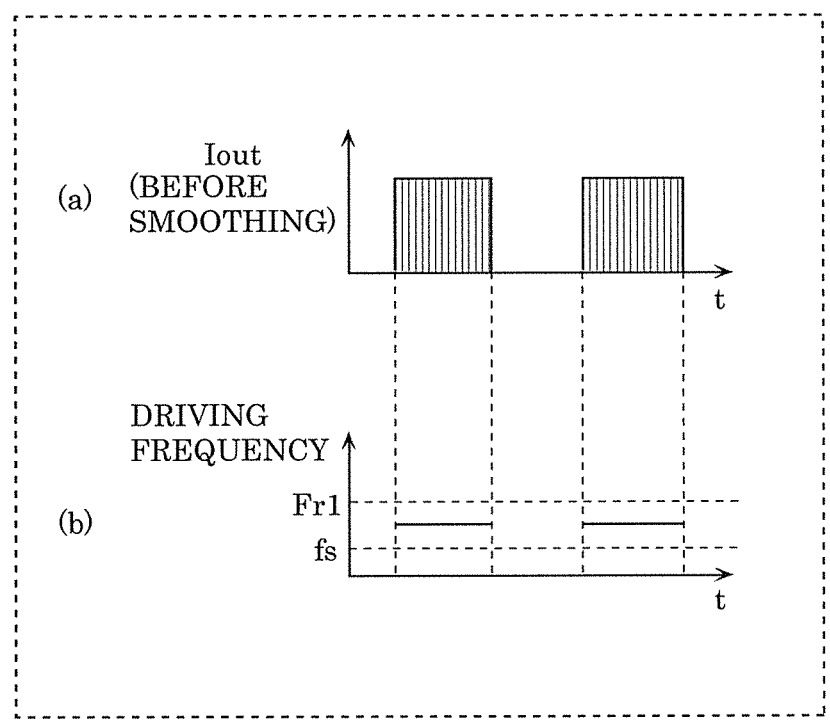
FIG. 4 illustrates graphs each showing a temporal waveform of an output current to be smoothed (before smoothing) or a temporal waveform of a driving frequency for driving switching elements in a lighting device in a comparison example.

FIG. 4 illustrates graphs each showing a temporal waveform of output current Iout to be smoothed (before smoothing) or a temporal waveform of a driving frequency for driving switching elements in a lighting device in a comparison example. The lighting device in the comparison example is different from lighting device 2 according to this embodiment in the point of not providing any frequency gradual decrease period, and is the same in the other points.

Figure 5:
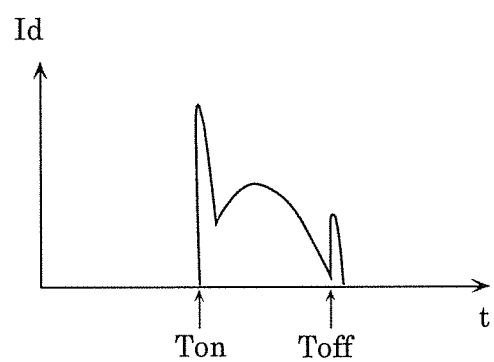
FIG. 5 illustrates a graph showing an example of a temporal waveform of a current that flows in the switching elements when a switching period is started in the lighting device in the comparison example.

FIG. 5 illustrates a graph showing an example of a temporal waveform of a current that flows in the switching elements when a switching period is started in the lighting device in the comparison example. At each of time points Ton and Toff shown in FIG. 3, control unit 54 switches ON and OFF the switching elements respectively and inversely.

As illustrated in FIG. 3, a current is flowing in switching elements 11 and 12 without occurrence of serge, after time points Ton and Toff. Stated differently, occurrence of ringing is prevented in DC/DC converter 7 of lighting device 2.

On the other hand, in the lighting device in the comparison example, no frequency gradual decrease period is provided while intermittent driving is performed, as illustrated in graphs (a) and (b) of FIG. 4. As shown in FIG. 5, in the lighting device in the comparison example which performs this operation, serge occurs in a current that flows to the switching element at the time when a switching period is started, after each of time points Ton and Toff. Stated differently, ringing occurs in the DC/DC converter of the lighting device in the comparison example.

As described above, lighting device 2 according to this embodiment is capable of preventing ringing from occurring when each switching period is started in intermittent driving. In this embodiment disclosed herein, switching elements 11 and 12 are controlled so that the driving frequency for driving switching elements 11 and 12 is no lower than first resonance frequency Fr1 when the frequency gradual decrease period is started. However, the driving frequency may not be the frequency no lower than first resonance frequency Fr1. It is only necessary that a period in which a driving frequency gradually decreases be provided in the initial part of the switching period. The period is a period in which switching elements 11 and 12 are driven at a driving frequency no lower than a driving frequency in the remaining switching period other than the initial part (the remaining period is a frequency constant period) of the switching period. In this way, ringing is at least partly prevented more significantly than in the case where the switching elements are driven at a constant driving frequency even in the initial part of the switching period.

1-4. Examples of Dimming Operations

Next, an example of dimming operation performed by lighting device 2 according to this embodiment is described with reference to FIG. 6.

Figure 6:
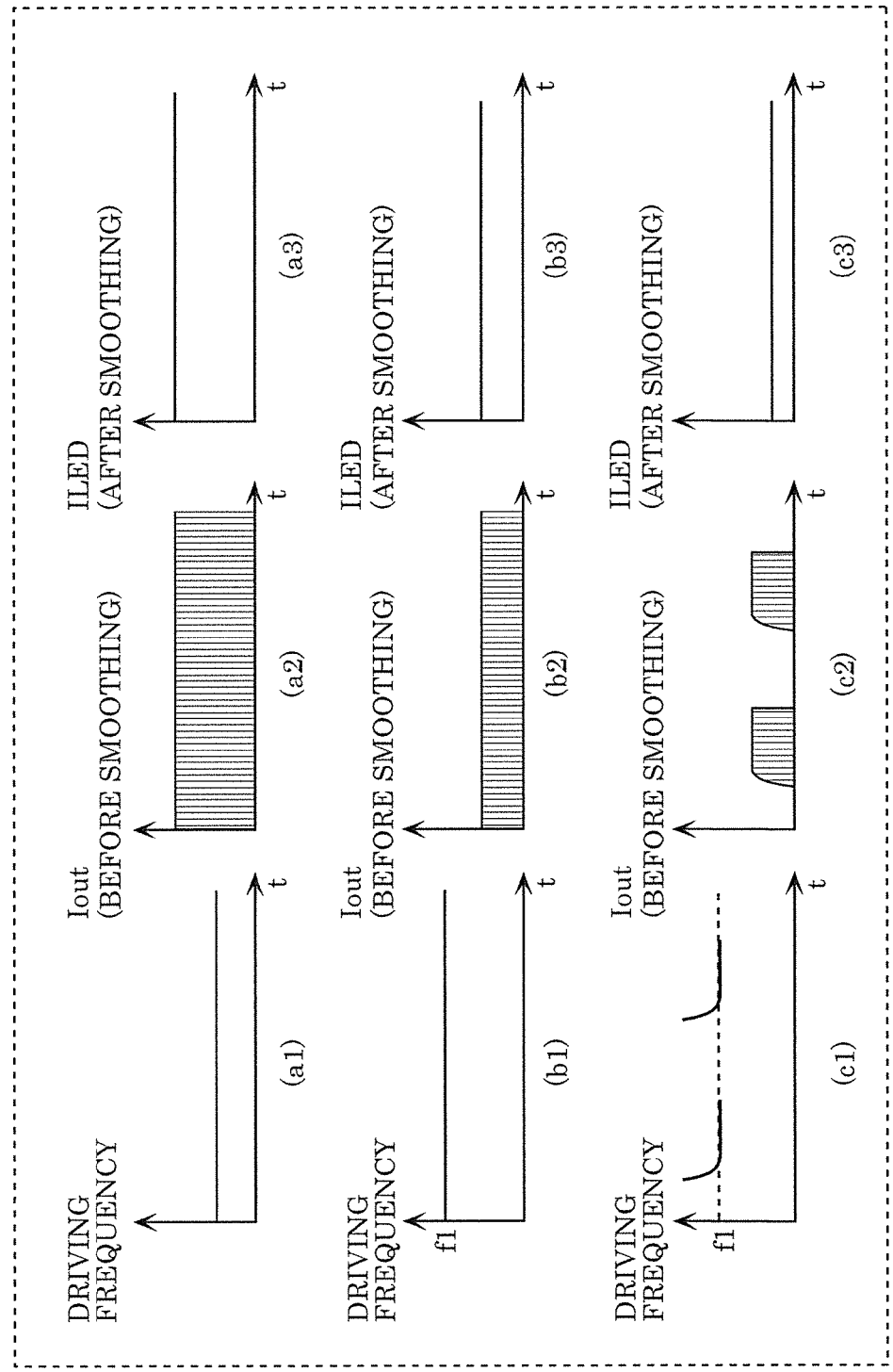
FIG. 6 illustrates graphs each showing a temporal waveform of a driving frequency etc. with respect to a corresponding one of three dimming levels in the lighting device according to Embodiment 1.

FIG. 6 illustrates graphs each showing a temporal waveform of a driving frequency etc. with respect to a corresponding one of three dimming levels in lighting device 2 according to this embodiment. In FIG. 6, each of graphs (a1), (a2), and (a3) shows a temporal waveform of a driving frequency, output current Iout to be smoothed (before smoothing), or smoothed output current ILED (after smoothing) to be supplied to LED 8 in the case where a dimming level is low (that is, the amount of light is large). In FIG. 6, each of graphs (b1), (b2), and (b3) shows a temporal waveform of a driving frequency, output current Iout, or output current ILED in the case where a dimming level is medium (that is, the amount of light is medium). In FIG. 6, each of graphs (c1), (c2), and (c3) shows a temporal waveform of a driving frequency, output current Iout to be smoothed, or smoothed output current ILED to be supplied to LED 8 in the case where a dimming level is high (that is, the amount of light is small).

As illustrated in FIG. 6, lighting device 2 causes switching elements 11 and 12 to operate continuously without driving them intermittently except for a case in which a dimming level is high. Here, comparison between a case in which a dimming level is low and a case in which a dimming level is medium shows (see graphs (a2), (a3), (b2), and (b3) of FIG. 6) that lighting device 2 decreases output currents Iout and ILED by increasing the driving frequency for driving switching elements 11 and 12 as the dimming level increases (see graphs (a1) and (b1) of FIG. 6). Lighting device 2 drives switching elements 11 and 12 intermittently in order to reduce switching losses by increasing a driving frequency when further increasing a dimming level (see graphs (c1) and (c2) of FIG. 6). It is to be noted that current ILED to be applied to LED 8 is smoothed by smoothing capacitor 30 (see graph (c3) of FIG. 6). As shown in graph (c1) of FIG. 6, a frequency gradual decrease period is provided in lighting device 2 in the case where switching elements 11 and 12 are driven intermittently as described above.

The following describes driving frequencies for driving switching elements 11 and 12 in the above-described dimming operations and duties in the switching periods.

Figure 7:
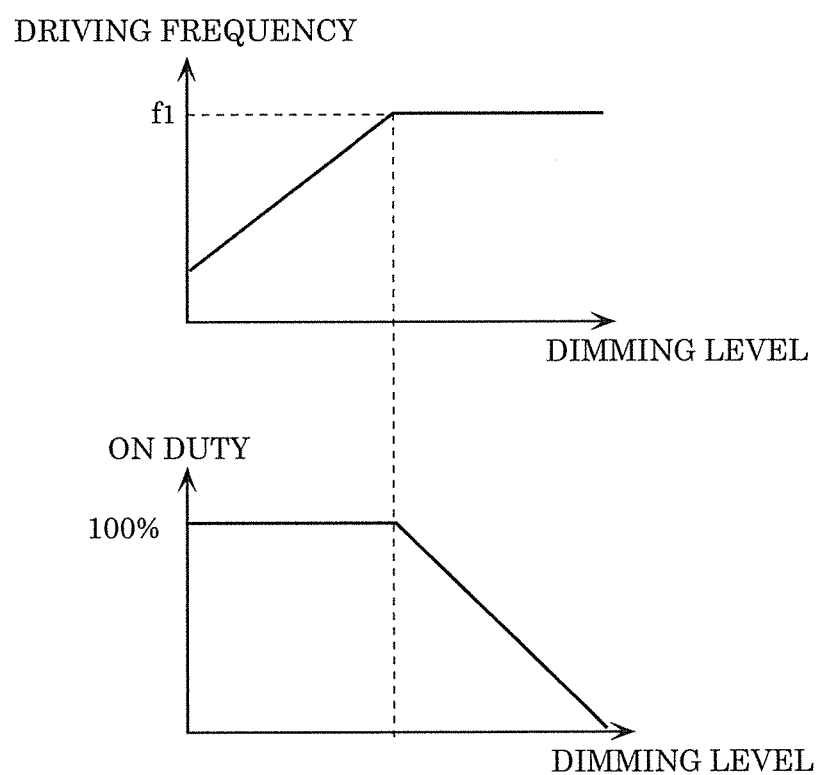
FIG. 7 illustrates graphs each showing a relationship between driving frequencies and dimming levels, or a relationship between duties (ON duties) in switching periods and dimming levels in the lighting device according to Embodiment 1.

FIG. 7 illustrates graphs each showing a relationship between a driving frequency, a duty (ON duty) in a switching period, and a dimming level in lighting device 2 according to this embodiment. In FIG. 7, the dimming levels presented by the horizontal axis become higher (that is, the amounts of light become smaller) toward the right side.

As illustrated in FIG. 7, in lighting device 2 according to this embodiment, the dimming levels are adjusted by controlling the driving frequencies until the driving frequency for driving switching elements 11 and 12 reaches frequency f1 (see also (a1) and (b1) of FIG. 6). At this time, the ON duty is 100%. Stated differently, switching elements 11 and 12 are driven continuously. On the other hand, when dimming is performed at a level higher than the dimming level in the case where the driving frequency is frequency f1 and the ON duty is 100%, the higher-level dimming is performed by decreasing the ON duty while maintaining driving frequency of f1 as illustrated in FIG. 7. Stated differently, lighting device 2 drives switching elements 11 and 12 intermittently.

1-5. Dead Time Control

Next, descriptions are given of dead time control performed by lighting device 2 according to this embodiment.

In lighting device 2 according to this embodiment, a MOS current peak in each of switching elements 11 and 12 configured with NMOS transistors is small because the driving frequency is set to be higher than usual in the frequency gradual decrease period. As a result, the slope of voltages between the drain and the source in the switching operation is gentle, and the time required for the switching operation is long. In view of this point, it is also possible to set a long dead time which is a period in which both of switching elements 11 and 12 are switched off at the same time in lighting device 2 according to this embodiment. It is to be noted that setting a long dead time in the case where a driving frequency is not high increases a time duration in which no current is applied, resulting in a loss. Thus, it is also possible to set a long dead time only when a driving frequency is high.

Hereinafter, an example of a dead time control performed in lighting device 2 according to this embodiment is described with reference to FIG. 8.

Figure 8:
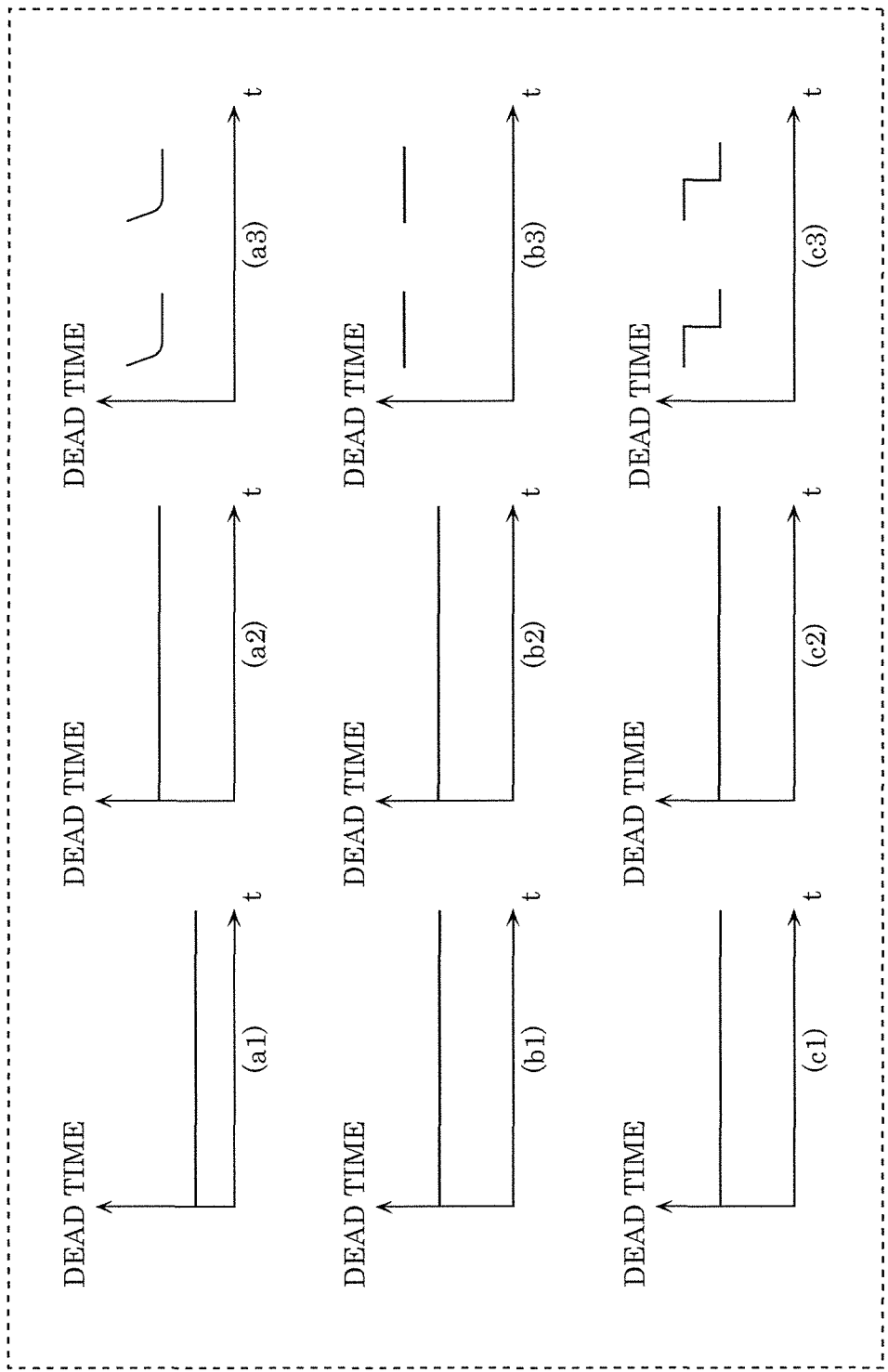
FIG. 8 illustrates graphs each showing a temporal waveform in a dead time in the lighting device according to Embodiment 1.

FIG. 8 illustrates graphs each showing a temporal waveform of a dead time in lighting device 2 according to this embodiment.

Each of graphs (a1), (a2), and (a3) of FIG. 8 shows a temporal waveform of a dead time in the example in which temporal derivatives of voltages between the drain and the source of switching element 12 are detected and dead time control is performed. Graphs (a1), (a2), and (a3) of FIG. 8 show a waveform in the case of a low dimming level, a waveform in the case of a medium dimming level, and a waveform in the case of a high dimming level, respectively. In this control example, a completion time of the switching operation is detected by detecting the time at which a temporal derivative of a voltage between the drain and the source of switching element 12 falls to the low level, and controls the dead time based on the time. Here, the temporal derivative can be detected, for example, by connecting one of the terminals of a capacitor for current detection at the connection point between switching elements 11 and 12, and measuring, by control unit 54 or the like, a derivative current that flows into the other terminal of the capacitor. In this control example, it is possible to detect the time from when a switching voltage is applied to the gate of switching element 12 to the time when the switching operation is completed (that is, the time required for the switching operation). Accordingly, it is possible to always set an appropriate dead time based on the time required for the switching operation.

Each of graphs (b1), (b2), and (b3) of FIG. 8 shows a temporal waveform of a dead time in the example in which a dead time is lengthened only when intermittent driving is performed. Graphs (b1), (b2), and (b3) of FIG. 8 show a waveform in the case of a low dimming level, a waveform in the case of a medium dimming level, and a waveform in the case of a high dimming level, respectively. This control example can be obtained by, for example, controlling a dead time when control unit 54 drives switching elements 11 and 12 intermittently. Since the dead time is lengthened in the intermittent driving in which the driving frequency is particularly high in this example, the dead time can be controlled with this simple configuration.

Each of graphs (c1), (c2), and (c3) of FIG. 8 shows a temporal waveform of a dead time in the example of control in which a dead time is lengthened in the frequency gradual decrease period. Graphs (c1), (c2), and (c3) of FIG. 8 show a waveform in the case of a low dimming level, a waveform in the case of a medium dimming level, and a waveform in the case of a high dimming level, respectively. This control example can be obtained by, for example, controlling a dead time over the frequency gradual decrease period when control unit 54 drives switching elements 11 and 12 intermittently. The length of the frequency gradual decrease period is calculated in advance based on a capacitance etc. of capacitor 47 illustrated in FIG. 1. In this example, the dead time is lengthened in the frequency gradual decrease period in which the driving frequency is high. Thus, it is possible to implement a lighting device which is simply configured and produces less amount of loss.

1-6. Summary Etc.

As described above, lighting device 2 according to this embodiment includes: switching elements 11 and 12 connected in series; DC/DC converter 7 including resonant circuit 13 connected to the connection point between switching elements 11 and 12; and control unit 54 which controls the driving of switching elements 11 and 12. Control unit 54 performs the intermittent driving in which the switching period and the non-switching period are alternately repeated. In the switching period, control unit 54 switches ON and OFF switching elements 11 and 12 respectively and inversely, and in the non-switching period, control unit 54 stops switching ON and OFF switching elements 11 and 12. Control unit 54 provides, at the initial part of the switching period, the frequency gradual decrease period in which the driving frequency for driving switching elements 11 and 12 is gradually decreased.

In this way, in DC/DC converter 7 of lighting device 2, an output current gradually increases at the initial part of the switching period when the intermittent driving is performed. Thus, it is possible to reduce ringing. Accordingly, it is possible to prevent a serge current from flowing into each of switching elements 11 and 12 in DC/DC converter 7, and to reduce stress to be applied to the switching element, etc.

In lighting device 2 according to this embodiment, resonant circuit 13 includes: electric transformer 15; inductor 14 connected in series to primary coil 15a of electric transformer 15; and resonant capacitor 16 connected in series to primary coil 15a and inductor 14. A current that flows secondary coil 15b of electric transformer 15 is supplied to LED 8.

In this way, DC/DC converter 7 in lighting device 2 is configured to include an LLC resonant circuit. In general, DC/DC converter 7 including the LLC resonant circuit is placed in a state where ringing easily occurs in a transition period that is the initial part of the switching period. However, lighting device 2 is capable of reducing a phase advancing operation by providing the frequency gradual decrease period. Accordingly, DC/DC converter 7 of lighting device 2 is capable of reducing ringing.

In lighting device 2 according to this embodiment, the driving frequency at the start time of the frequency gradual decrease period is higher than or equal to the first resonance frequency determined based on the inductance of resonant circuit 13 and the capacitance of resonant capacitor 16, and the driving frequency at the end time of the frequency gradual decrease period is lower than or equal to the first resonance frequency and higher than or equal to the second resonance frequency determined based on (i) the sum of the inductance of resonant circuit 13 and the magnetizing inductance of electric transformer 15 and (ii) the capacitance of resonant capacitor 16.

In this way, lighting device 2 can reduce ringing more reliably.

In lighting device 2 according to this embodiment, control unit 54 determines the length of a dead time of two switching elements 11 and 12 to be a first time when the driving frequency is a first frequency, and determines the length of a dead time of two switching elements 11 and 12 to be a second time longer than the first time when the driving frequency is a second frequency higher than the first frequency.

In this way, when the driving frequency is high, it is possible to reduce the time in which both of switching elements 11 and 12 are in an ON state.

In lighting device 2 according to this embodiment, control unit 54 skips providing the non-switching period in which control unit 54 stops switching ON and OFF two switching elements 11 and 12 when a current that is supplied to LED 8 is larger than a predetermined value, and provides the non-switching period when a current that is supplied to LED 8 is smaller than the predetermined value.

In this way, no intermittent driving is performed when switching loss can be controlled to be small without performing intermittent driving. Thus, it is possible to reduce occurrence of ringing more significantly.

Although the dimming levels are adjusted by controlling the ON duty at the time of intermittent dimming in this embodiment, it is also possible to control both of an ON duty and a driving frequency.

In this case, it is possible to control the two parameters of the ON duty and the driving frequency, and thus to perform dimming control with a higher accuracy.

Embodiment 2

Next, descriptions are given of lighting device 2a according to Embodiment 2. In the above Embodiment 1, the length of the frequency gradual decrease period is constant. However, when a non-switching period is short, most of charges accumulated in smoothing capacitor 30 are not emitted at the end time of a non-switching period (at the start time of a driving period), and thus smoothing capacitor 30 is in the state of receiving a high voltage applied thereto. Thus, in this case, ringing can be reduced even when the frequency gradual decrease period is short. In view of this, in this embodiment, the length of the frequency gradual decrease period is controlled according to a voltage etc. applied to the smoothing capacitor.

Hereinafter, lighting device 2a according to this embodiment is described mainly focused on elements different from those in lighting device 2 according to Embodiment 1, and the same elements as in Embodiment 1 are not described repeatedly.

2-1. Configuration of Whole Lighting Device

First, a configuration of whole lighting device 2a according to this embodiment is described.

Figure 9:
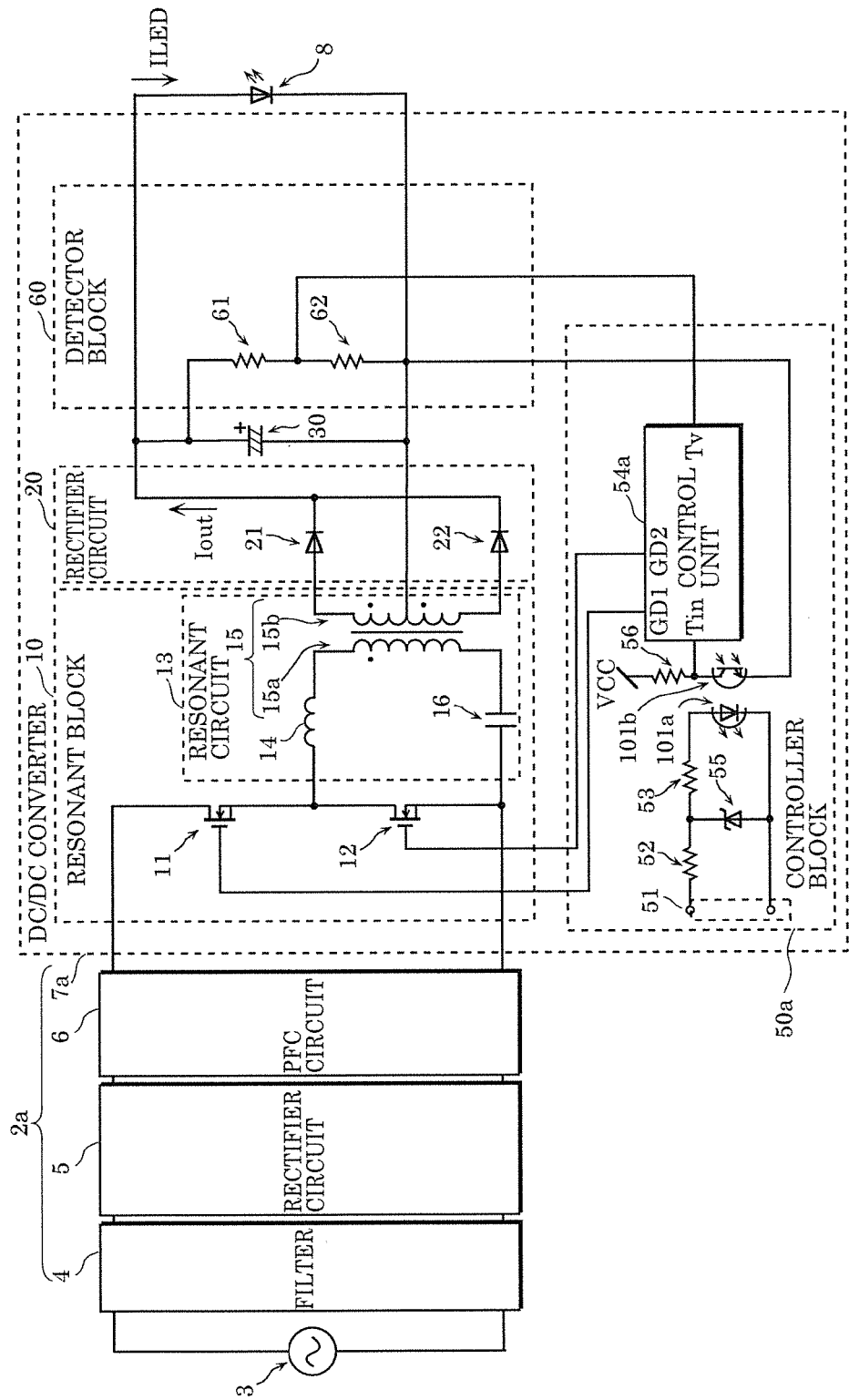
FIG. 9 is a circuit diagram illustrating a circuit configuration of a lighting device according to Embodiment 2.

FIG. 9 is a circuit diagram illustrating a circuit configuration of lighting device 2a according to Embodiment 2. As in FIG. 1, alternating power source 3 and LED 8 are also illustrated in the diagram.

As illustrated in FIG. 9, lighting device 2a according to this embodiment includes: filter 4; rectifier circuit 5; PFC circuit 6; and DC/DC converter 7a, similarly to lighting device 2 according to Embodiment 1. Lighting device 2a according to this embodiment is different from lighting device 2 according to Embodiment 1 in the configuration of DC/DC converter 7a.

As illustrated in FIG. 9, DC/DC converter 7a includes: resonant block 10; rectifier circuit 20; smoothing capacitor 30; detector block 60; and controller block 50. Hereinafter, descriptions are given of the differences between DC/DC converter 7a according to this embodiment and DC/DC converter 7 according to Embodiment 1. The differences are that DC/DC converter 7a does not include any error amplifier block, and includes detector block 60, and that controller block 50a is configured differently.

As described above, DC/DC converter 7a according to this embodiment does not include any error amplifier block. Stated differently, DC/DC converter 7a does not perform feedback control of a driving frequency based on a current that flows in LED 8, and does not provide a frequency gradual decrease period using an error amplifier block. In lighting device 2a according to this embodiment, a frequency gradual decrease period is provided by controller block 50a.

Detector block 60 is a circuit which detects a voltage to be applied to smoothing capacitor 30. As illustrated in FIG. 9, detector block 60 includes resistors 61 and 62 for voltage division, and detects divided voltages obtained by dividing a voltage that is applied to smoothing capacitor 30 and corresponding to the ratio between the resistance values of resistors 61 and 62.

Controller block 50a includes: signal input unit 51; resistors 52, 53, and 56; Zener diode 55; LED 101a; photo transistor 101b; and control unit 54a.

Control unit 54a is a processing unit for controlling switching elements 11 and 12 based on a signal that is input to signal input unit 51. Control unit 54a includes at least four terminals (terminal GD1, terminal GD2, terminal Tin, and terminal Tv). Terminal GD1, terminal GD2, and terminal Tin are the same as the respective terminals of control unit 54 according to Embodiment 1. Terminal Tv is a terminal which receives, from detector block 60, the divided voltages obtained by dividing the voltage applied to smoothing capacitor 30. Control unit 54a detects the voltage applied to smoothing capacitor 30 in terminal Tv, and controls switching elements 11 and 12 based on the voltage. In lighting device 2a according to this embodiment, control unit 54a controls switching elements 11 and 12 based on the signal corresponding to a dimming signal which is input to terminal Tin, and does not perform feedback control. For this reason, in lighting device 2a, control unit 54a causes the respective switching elements to operate continuously or drive intermittently, based on the dimming signal. For example, control unit 54a may store a table showing associations between (i) dimming signals and (ii) driving frequencies and ON duties, and control the respective switching elements based on the table. Control unit 54a controls the respective switching elements in such a manner that a frequency gradual decrease period is provided at an initial part of a switching period in intermittent driving. In this embodiment, control unit 54a performs control such that the frequency gradual decrease period is shorter when the voltage which is applied to smoothing capacitor 30 immediately before a switching period is higher. For example, control unit 54a may store a table showing associations between (i) voltages each applied to smoothing capacitor 30 at the start time of a switching period and the lengths of frequency gradual decrease periods, and control the respective frequency gradual decrease periods based on the table. Control unit 54a may be configured with hardware only, or may be implemented by combining hardware and software. Control unit 54a may be implemented, for example, in the form of a micro processor.

2-2. Examples of Dimming Operations

Next, an example of a dimming operation performed by lighting device 2a according to this embodiment is described with reference to FIG. 10.

Figure 10:
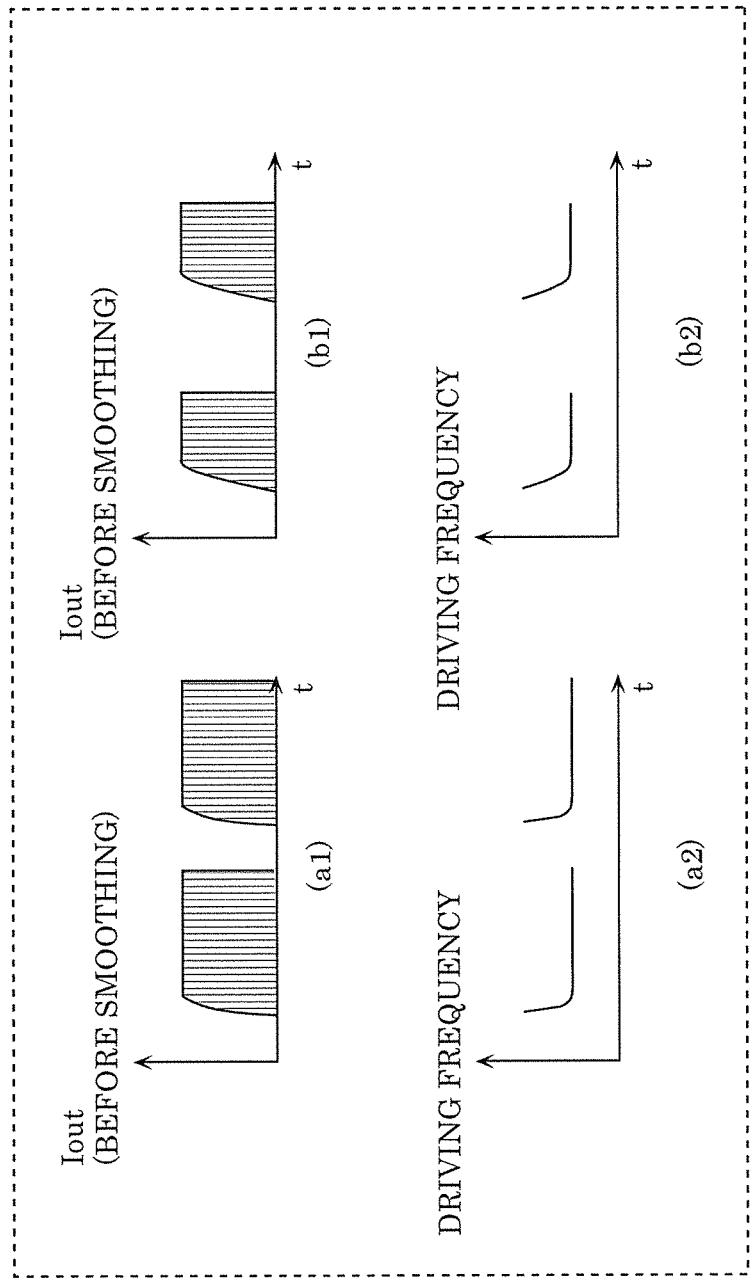
FIG. 10 illustrates graphs each showing a temporal waveform of an output current to be smoothed (before smoothing) for two dimming levels and a driving frequency in the lighting device according to Embodiment 2.

FIG. 10 illustrates graphs each showing a temporal waveform of output current Iout to be smoothed (before smoothing) and a temporal waveform of a driving frequency, at a corresponding one of two dimming levels. The temporal waveform is obtained in lighting device 2a according to this embodiment. In FIG. 10, each of graphs (a1) and (a2) shows the temporal waveform of output current Iout to be smoothed and the temporal waveform of the driving frequency, in the case where a stoppage time is comparatively short. In FIG. 10, each of graphs (b1) and (b2) shows the temporal waveform of output current Iout to be smoothed and the temporal waveform of the driving frequency, in the case where a stoppage time is comparatively short.

As illustrated in graphs (a2) and (a2) of FIG. 10, frequency gradual decrease periods are controlled to be shorter when the non-switching period is shorter (graph (a2)) than when the non-switching period is longer (graph (b2)). In this way, as illustrated in graphs (a1) and (a2) of FIG. 10, time in which output current Iout increases gradually is shorter when the frequency gradual decrease period is shorter. However, in the cases shown in graphs (a1) and (a2), a comparatively high voltage is applied to smoothing capacitor 30 immediately before each of the switching periods. Stated differently, the respective elements in DC/DC converter 7a such as smoothing capacitor 30 are in a state similar to a state in a switching period. Thus, it is possible to stabilize a current which flows in switching elements 11 and 12 after a comparatively short frequency gradual decrease period.

2-3. Summary Etc.

As described above, in lighting device 2a according to this embodiment, control unit 54a detects a voltage in smoothing capacitor 30 at the start time of the switching period, and sets the length of the frequency gradual decrease period to a third time when the voltage is a first value, or sets the length of the frequency gradual decrease period to a fourth time shorter than the third time when the voltage is a second value larger than the first value.

In this way, it is possible to reduce a frequency gradual decrease period, and ringing. Since it is possible to lengthen a period in which a frequency is constant in a switching period by reducing the frequency gradual decrease period, it is possible to reduce a variation in the amount of a current in each switching period, and to control the amount of a current to be applied to LED 8 with a high accuracy.

Embodiment 3

Next, descriptions are given of lighting device 2b according to Embodiment 3.

For the purpose of intermittently driving switching elements of a DC/DC converter in a lighting device, a smoothing capacitor is provided in an output part of the DC/DC converter in order to prevent output light flickers due to ripples of an output current. When the capacitance of the smoothing capacitor is increased excessively in order to reliably prevent light output from the lighting device from flickering, activation time of the lighting device is increased with the increase in the size of the smoothing capacitor and an increase in time constant. In view of this, a smoothing capacitor is generally provided in the DC/DC converter, and is controlled to perform intermittent driving at a high frequency in order to prevent ripples of an output current.

However, when an intermittent frequency which is a frequency in intermittent driving is increased in the case of deep dimming, the number of switching cycles in a switching period in which control unit 54b switches ON and OFF switching elements respectively and inversely is decreased. Here, a current which flows in the DC/DC converter is likely to be unstable in the initial part of the switching period. For this reason, when the number of switching cycles in the switching period is small, a variation in the amount of a current in the switching period is noticeable.

The lighting device etc. according to this embodiment has been configured to be able to reduce ripples of an output current when intermittent driving is performed.

The Inventor has studied diligently and found that it is possible to reduce ripples of an output current even if an intermittent frequency is low when a dimming level is high because of decrease in the current to be consumed in the smoothing capacitor provided in the output part of the DC/DC converter. In view of this, lighting device 2b according to this embodiment performs control for reducing an intermittent frequency when increasing a dimming level.

Hereinafter, the lighting device according to this embodiment is described mainly focused on elements different from those in lighting device 2 according to Embodiment 1, and the same elements as in Embodiment 1 are not described repeatedly.

3-1. Configuration of Whole Lighting Device

First, a configuration of whole lighting device 2b according to this embodiment is described.

Figure 11:
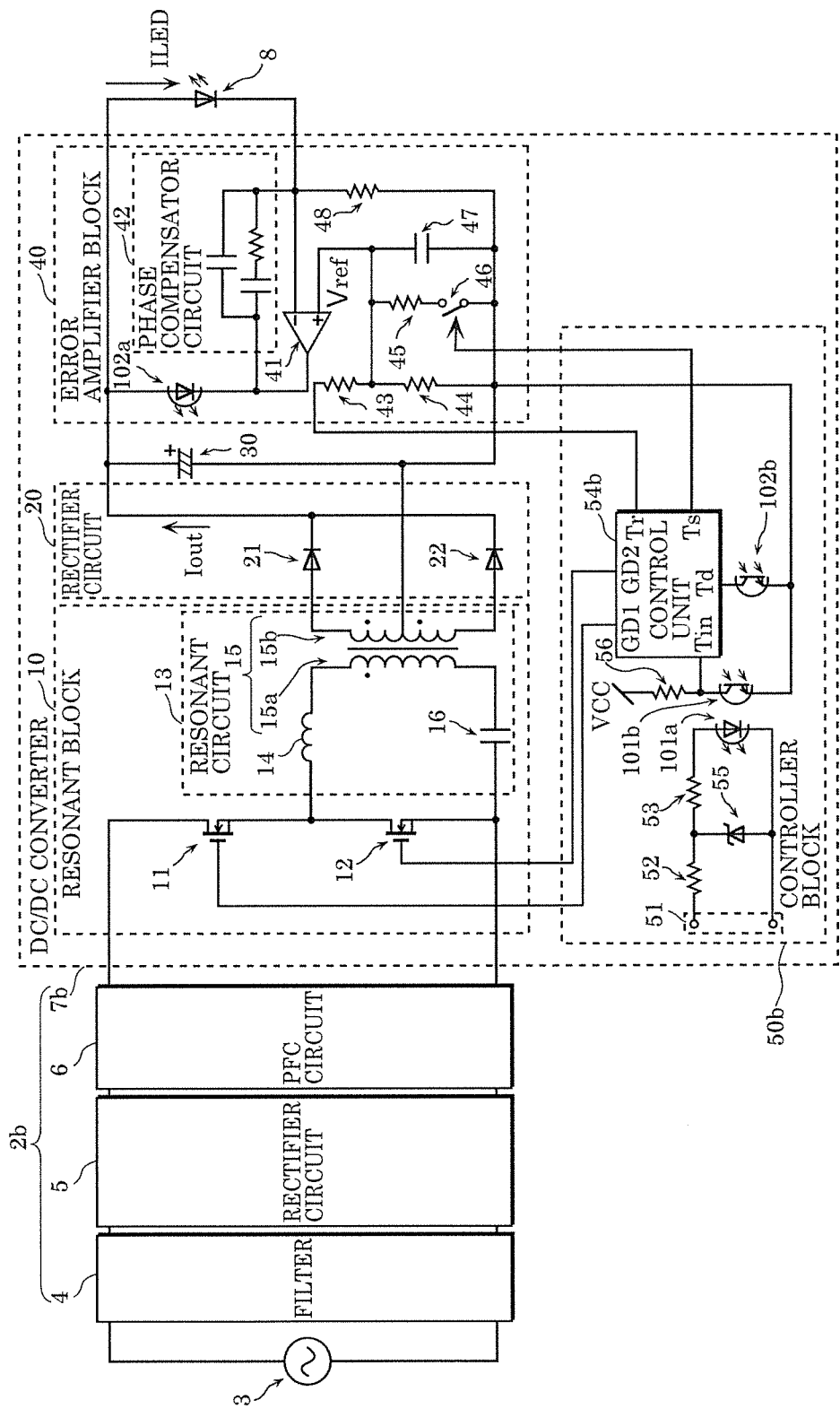
FIG. 11 is a circuit diagram illustrating a circuit configuration of a lighting device according to Embodiment 3.

FIG. 11 is a circuit diagram illustrating a circuit configuration of lighting device 2b according to this embodiment. As in FIG. 1 etc, alternating power source 3 and LED 8 are also illustrated in the diagram.

As illustrated in FIG. 11, lighting device 2b according to this embodiment includes: filter 4; rectifier circuit 5; PFC circuit 6; and DC/DC converter 7b, similarly to lighting device 2 according to Embodiment 1. Lighting device 2b according to this embodiment is different from lighting device 2 according to Embodiment 1 in the configuration of control unit 54b included in controller block 50b in DC/DC converter 7b. Hereinafter, a description is given of the configuration of control unit 54b which is the difference between DC/DC converter 7b according to this embodiment and DC/DC converter 7 according to Embodiment 1.

Control unit 54b according to this embodiment is different in performing control for reducing an intermittent frequency in the case of performing deep diming, based on a dimming signal input from signal input unit 51, and is the same in the other points.

More specifically, control unit 54b according to this embodiment switches ON and OFF switching element 46 by controlling a voltage to be applied to terminal Ts, in the same manner as control unit 54 according to Embodiment 1 when a PWM signal indicating deep dimming is input from terminal Tin. Control unit 54b according to this embodiment performs control for reducing an intermittent frequency when the duty ratio (ON duty) in a switching period in which control unit 54b switches ON and OFF switching elements 11 and 12 respectively and inversely is lower than a predetermined value in the intermittent driving. The predetermined value is, for example, determined as below. For example, when a driving frequency is 40 kHz and an intermittent frequency is 1 kHz, the predetermined value is set to be approximately 50% so that the number of switching cycles in each switching periods exceeds 20. The driving frequency is set to be higher than a maximum audible frequency (approximately 20 kHz) so as to prevent occurrence of a large amount of switching loss. The intermittent frequency is set to be a frequency which is sufficiently higher than 500 Hz which is the lower limit value for a pulse recurrence frequency in which flickering of output light is not visually recognizable as defined in the Electrical Appliance Material Safety Law. Even when the range of ON duty in which an intermittent frequency is controlled to be low is restricted, it is desirable that such control be performed in the on-duty range below 10%. The upper limit of 10% for the ON duty is determined under the condition that it is possible to increase the number of switching cycles in the switching period to 10 or larger when the driving frequency is 50 kHz and the intermittent frequency is 500 Hz.

In this way, it is possible to reduce ripples of an output current even in the case where the dimming level is high.

3-2. Examples of Dimming Operations

Next, an example of a dimming operation performed by lighting device 2b according to this embodiment is described with reference to FIG. 12.

Figure 12:
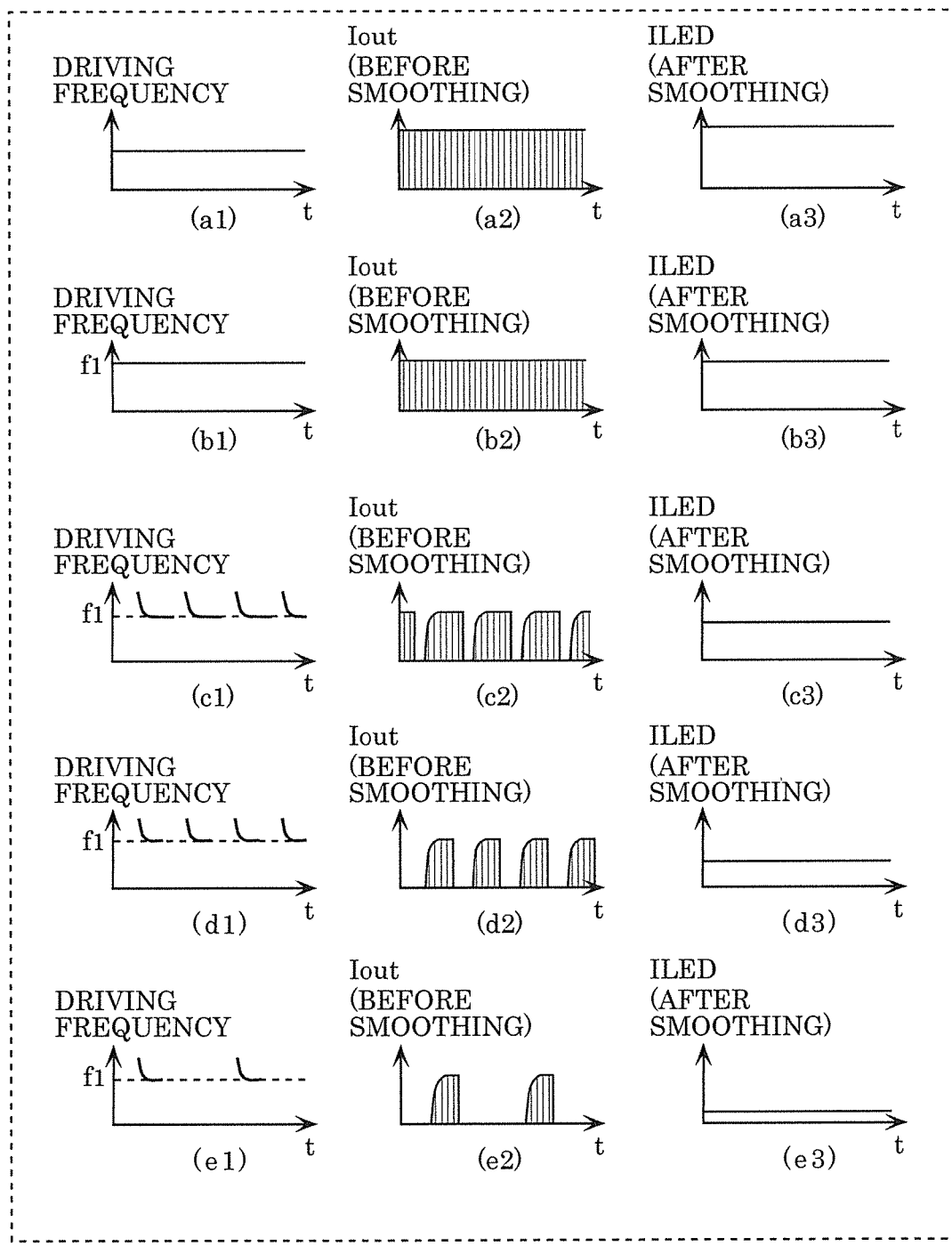
FIG. 12 illustrates graphs each showing a temporal waveform of a driving frequency etc. with respect to a corresponding one of five dimming levels in the lighting device according to Embodiment 3.

FIG. 12 illustrates graphs each showing a temporal waveform of a driving frequency etc. with respect to a corresponding one of five dimming levels in lighting device 2b according to this embodiment. In FIG. 12, graphs (a1), (a2), and (a3) respectively show the temporal waveform of a driving frequency for driving switching elements 11 and 12, output current Iout to be smoothed (before smoothing), and smoothed output current ILED in the case where the amount of output light is 100% (that is, the maximum amount of light). In FIG. 12, graphs (b1), (b2), and (b3) respectively show the temporal waveform of a driving frequency, output current IOUT, or output current ILED in the case where the amount of output light is 80%. In FIG. 12, graphs (c1), (c2), and (c3) respectively show the temporal waveform of a driving frequency, output current IOUT, and output current ILED in the case where the amount of output light is 60%. In FIG. 12, graphs (c1), (c2), and (c3) respectively show the temporal waveform of a driving frequency, output current IOUT, and output current ILED in the case where the amount of output light is 40%. In FIG. 12, graphs (e1), (e2), and (e3) respectively show the temporal waveform of a driving frequency, output current IOUT, and output current ILED in the case where the amount of output light is 20%.

As shown in graphs (a1) to (a3), (b1) to (b3), (c1) to (c3), and (d1) to (d3) of FIG. 12, when the amount of output light is larger than or equal to 40%, lighting device 2b according to this embodiment operates in the same manner as lighting device 2 according to Embodiment 1. In lighting device 2b according to this embodiment, the ON duty in intermittent driving is 50% when the amount of output light is 40%. For this reason, when the amount of output light is larger than or equal to 40% and intermittent driving is performed, switching elements 11 and 12 are driven at the same intermittent frequency (see graphs (c2) and (d2) of FIG. 12). On the other hand, as shown in graph (e2) of FIG. 12, the ON duty in intermittent driving is smaller than or equal to 50% when the amount of output light is 20%, and thus switching elements 11 and 12 are controlled so that the intermittent frequency is lower than a frequency in the case where the ON duty is larger than 50%. Here, in order to reduce the intermittent frequency, the non-switching period is lengthened while maintaining the switching period in lighting device 2b according to this embodiment.

A variation in each of parameters in dimming operations performed by lighting device 2b according to this embodiment is described with reference to FIG. 13.

Figure 13:
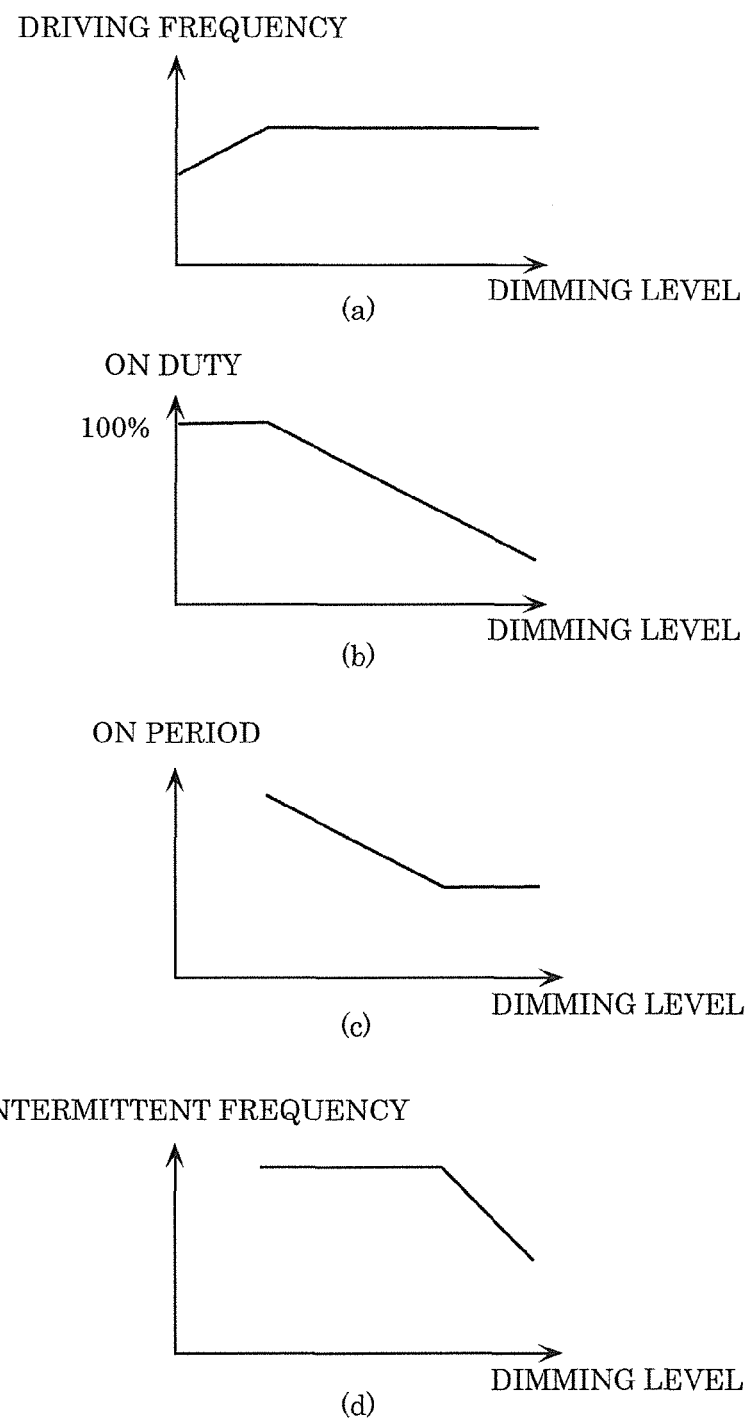
FIG. 13 illustrates graphs each showing a variation in a parameter with respect to dimming levels in the lighting device according to Embodiment 3.

FIG. 13 illustrates graphs each showing a variation in a corresponding one of the parameters with respect to dimming levels of lighting device 2b according to this embodiment. Graphs (a), (b), (c), and (d) of FIG. 13 respectively show variations in driving frequencies, ON duties, the lengths of switching (ON periods), and intermittent frequencies. In each of graphs of FIG. 13, the dimming levels presented by the horizontal axis become higher (that is, the amounts of light become smaller) toward the right side.

As shown in graph (a) of FIG. 13, lighting device 2b according to this embodiment performs dimming by controlling driving frequencies when the dimming level is low. When the dimming level is medium, as shown in graphs of (b) to (d) of FIG. 13, dimming is performed by maintaining the intermittent frequency for intermittent driving and reducing the ON duty, that is, shortening the ON period. When the dimming level is high, as shown in each of graphs (b) to (d), dimming is performed by lengthening the non-switching period to thereby reducing the intermittent frequency and the ON duty while maintaining the ON period.

In this way, in lighting device 2b according to this embodiment, the number of switching cycles in each switching period is controlled so as not to be too small even when the dimming level is high, and thus a variation in the amount of a current for each switching period is reduced. Furthermore, in lighting device 2b according to this embodiment, ripples of an output current are also reduced.

Here, examples of dimming operations performed by a lighting device in a comparison example is described to facilitate understanding of effects of lighting device 2b according to this embodiment. The lighting device in this comparison example described here includes the same configuration as this embodiment except for not adjusting an intermittent frequency.

Figure 14:
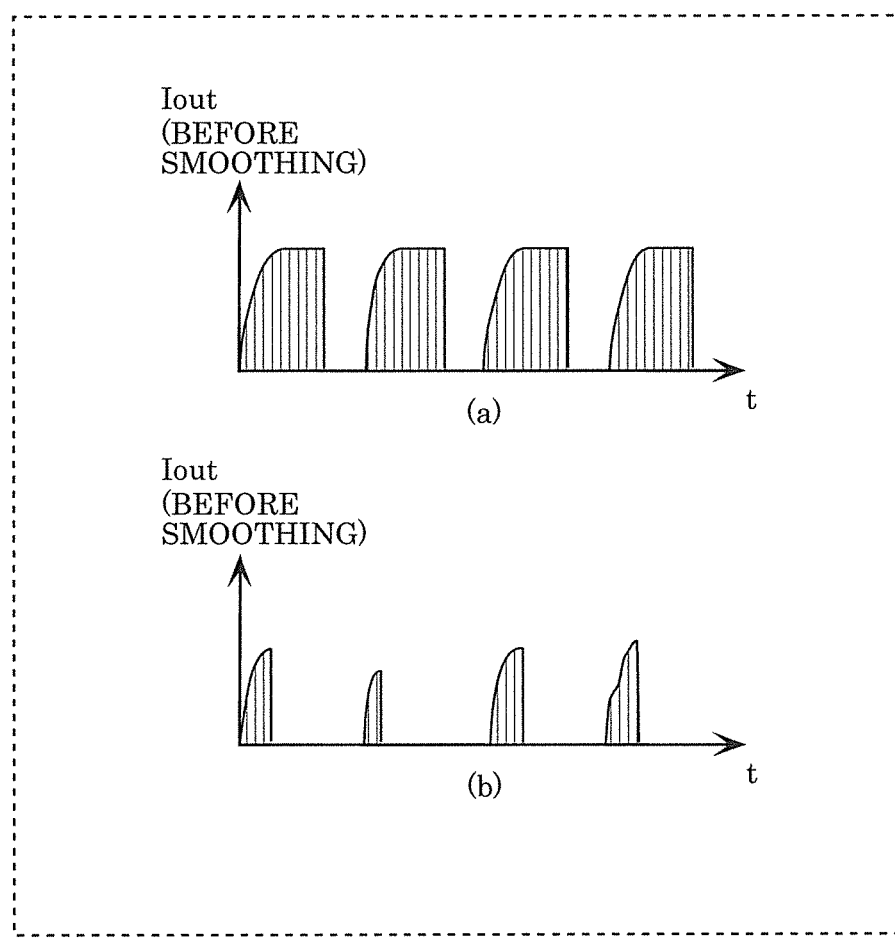
FIG. 14 illustrates graphs each showing a temporal waveform of an output current to be smoothed (before smoothing) in the case where dimming is performed in the lighting device in the comparison example.

FIG. 14 illustrates graphs each showing a temporal waveform of an output current to be smoothed (before smoothing) in the case where dimming is performed in the lighting device in the comparison example. In FIG. 14, graph (a) shows a current waveform in the case where the ON duty is larger than 50%, and graph (b) shows a current waveform in the case where the ON duty is smaller than or equal to 50%.

As shown in graph (a) of FIG. 14, a variation in the current waveform in each switching period is not noticeable when the ON duty is larger than 50%. However, as shown in graph (b) of FIG. 14, a variation in the current waveform in each switching period is noticeable when the ON duty is smaller than or equal to 50% because the switching period is short.

3-3. Summary Etc.

As described above, lighting device 2b according to this embodiment includes: switching elements 11 and 12 connected in series; DC/DC converter 7 including resonant circuit 13 connected to the connection point between switching elements 11 and 12; and control unit 54b which controls the driving of switching elements 11 and 12. Control unit 54b performs intermittent driving in which the switching period and the non-switching period are alternately repeated. In the switching period, control unit 54b switches ON and OFF switching elements 11 and 12 respectively and inversely, and the non-switching period in which control unit 54b stops switching ON and OFF switching elements 11 and 12. Control unit 54b either (i) sets an intermittent frequency that is a frequency in the intermittent driving to a third frequency when a duty ratio in the switching period is a first duty ratio, or (ii) sets an intermittent frequency to a fourth frequency lower than the third frequency when the duty ratio is a second duty ratio lower than the first duty ratio.

In this way, when deep diming is performed by intermittent driving, it is possible to reduce a variation in the amount of a current in each switching period and reduce ripples of an output current.

In lighting device 2b according to this embodiment, resonant circuit 13 includes: electric transformer 15; inductor 14 connected in series to primary coil 15a of electric transformer 15; and resonant capacitor 16 connected in series to primary coil 15a and inductor 14. A current that flows in secondary coil 15b of electric transformer 15 is supplied to LED 8.

In this way, DC/DC converter 7b in lighting device 2b is configured as an LLC resonant circuit. In general, in the DC/DC converter including the LLC resonant circuit is placed in a state where ringing easily occurs in a transition period that is the initial part of the switching period. Accordingly, in order to stabilize an output current, there is a need to reduce the ratio of the transition period with respect to the switching period by lengthening the switching period. Lighting device 2b is capable of lengthening the switching period, and thus increasing the stability of the output current.

In lighting device 2b according to this embodiment, control unit 54b adjusts the intermittent frequency by changing the length of the non-switching period while maintaining the length of the switching period.

In this way, the switching period is set to have a predetermined constant length, and thus the switching period having the predetermined length can be maintained. By setting the predetermined length to be an appropriate length, it is possible to reduce a variation in the amount of a current for each switching period.

In lighting device 2b according to this embodiment, control unit 54b determines the length of a dead time of two switching elements 11 and 12 to be a first time when the driving frequency is a first frequency, and determines the length of a dead time of two switching elements 11 and 12 to be a second time when the driving frequency is a second frequency higher than the first frequency.

In this way, in the general-use lighting device which drives at the driving frequency and the intermittent frequency, it is possible to reliably reduce a variation in the amount of a current for each switching period and ripples of an output current.

In lighting device 2b according to this embodiment, control unit 54b provides, in the initial part of each switching period, a frequency gradual decrease period in which a driving frequency for driving switching elements 11 and 12 is gradually decreased.

In this way, in DC/DC converter 7b of lighting device 2b, an output current gradually increases at the initial part of the switching period when the intermittent driving is performed. Thus, it is possible to reduce ringing. Accordingly, it is possible to prevent a serge current from flowing into each of the switching elements in DC/DC converter 7b, and to reduce stress to be applied to each switching element etc.

Embodiment 4

Next, descriptions are given of luminaire 80 according to Embodiment 4.

Figure 15:
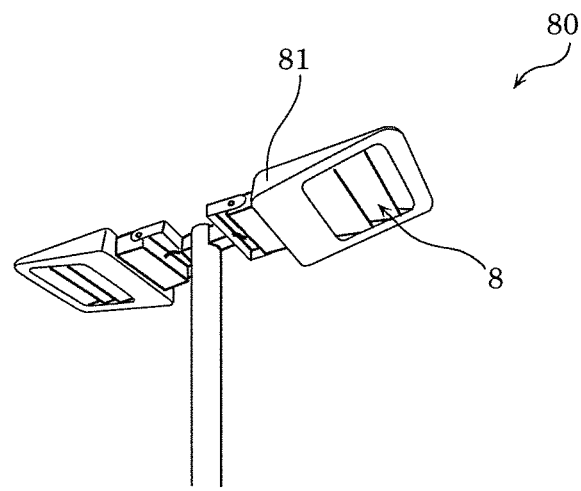
FIG. 15 is an external view of a luminaire according to Embodiment 4.

FIG. 15 is an external view of luminaire 80 according to this embodiment. Luminaire 80 includes any of the lighting devices according to Embodiments 1 to 3 and LED 8 which receives supply of a current from the lighting device. In this embodiment, luminaire 80 is a luminaire for use in a street, houses the lighting device, and has body 81 in which LED 8 is mounted.

Luminaire 80 includes one of the lighting devices according to Embodiments 1 to 3, and thus is capable of providing the same effects as in the corresponding embodiment.

VARIATION ETC.

The lighting devices and luminaire according to the present disclosure have been described based on Embodiments 1 to 4 above, but the present disclosure is not limited to these embodiments. The herein disclosed subject matter is to be considered descriptive and illustrative only, and the appended Claims are of a scope intended to cover and encompass not only the particular embodiments disclosed, but also equivalent configurations, methods, and/or uses, specifically, embodiments obtainable by modifying any of the exemplary embodiments or combining any of the constituent elements thereof.

For example, the lighting device in each of the embodiments includes filter 4 etc., but the elements other than the DC/DC converter is not essential. For example, any of the lighting devices according to the embodiments may be configured to supply direct current power from a direct current power source to the DC/DC converter.

Rectifier circuit 20 according to any of the embodiments may use a synchronous rectification method in stead of the method using diodes 21 and 22.

Although two switching elements are used as switching elements which are connected to resonant circuit 13 in each of the embodiments, three or more switching elements may be included therein instead.

In Embodiment 2, the length of the frequency gradual decrease period is determined based on the voltage to be applied to smoothing capacitor 30. However, the method for determining the length of the frequency gradual decrease period is not limited thereto. The voltage to be applied to the smoothing capacitor immediately before the switching period is more likely to decrease as the non-switching period is longer. Thus, the length of the frequency gradual decrease period may be determined based on the length of the non-switching period. For example, the control unit is configured to either (i) set the length of the frequency gradual decrease period to a sixth time when the length of the non-switching period is a fifth time, or (ii) set the length of the frequency gradual decrease period to an eighth time shorter than the sixth time when the length of the non-switching period is a seventh time shorter than the fifth time. In this way, effects similar to the effects provided by lighting device 2a of Embodiment 2 can be obtained.

In Embodiment 3, the element which provides a frequency gradual decrease period is provided. However, the element may not be included. More specifically, the stability of an output current can be increased by providing an element which reduces an intermittent frequency when an ON duty is small instead of providing a frequency gradual decrease period.

In Embodiment 3, the frequency gradual decrease period is provided by error amplifier block 40 etc. However, blocks etc. for providing a frequency gradual decrease period are not limited thereto. For example, control unit 54b may provide a frequency gradual decrease period as in Embodiment 2 in which error amplifier block 40 is not included.

In each of the embodiments, a single control unit is included, but the control unit may be divided for each function. For example, the control unit may be divided into a control unit which controls the entire configuration and a control unit which controls only switching elements.

In each of the embodiments, smoothing capacitor 30 is an electrolytic capacitor. However, any capacitor capable of sufficiently smoothing an output current other than the electrolytic capacitor is possible.

The PWM signal used as a dimming signal in each of the embodiments may be any other signal. For example, a dimming signal may be a DC signal.

For example, in each of Embodiments 1 to 4, an LED is used as an example of a solid light emitting element. However, a solid light emitting element is not limited to an LED, and may be a solid light emitting element of another kind such as an organic electro-luminescence (EL) element, or the like.

The solid light emitting element is not limited to a single LED, and may comprise a plurality of LEDs. At this time, the plurality of LEDs may be connected in series, in parallel, or in a mixture of the both. The plurality of LEDs may be integrated into a module in which a plurality of LED chips are connected, or may be configured as a plurality of modules.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which supplies a current to a solid light emitting element, the lighting device comprising:

a DC/DC converter including two switching elements connected in series and a resonant circuit connected to a connection point between the two switching elements; and a control unit configured to control driving of the two switching elements, wherein the control unit is configured to:

perform intermittent driving in which a switching period and a non-switching period are alternately repeated, the switching period being a period in which the control unit switches ON and OFF the two switching elements respectively and inversely; and the non-switching period being a period in which the control unit stops switching ON and OFF the two switching elements; and provide, in an initial part of the switching period, a frequency gradual decrease period in which a driving frequency for driving the two switching elements is gradually decreased.

2. The lighting device according to claim 1, wherein the resonant circuit includes an electric transformer, an inductor connected in series to a primary coil of the electric transformer, and a resonant capacitor connected in series to the primary coil and the inductor, and a current that flows in a secondary coil of the electric transformer is supplied to the solid light emitting element.

3. The lighting device according to claim 2, wherein the driving frequency at a start time of the frequency gradual decrease period is higher than a first resonance frequency determined based on an inductance of the resonant circuit and a capacitance of the resonant capacitor, and the driving frequency at an end time of the frequency gradual decrease period is lower than or equal to the first resonance frequency, and higher than or equal to a second resonant frequency determined based on (i) a sum of the inductance of the resonant circuit and a magnetizing inductance of the electric transformer and (ii) the capacitance of the resonant capacitor.

4. The lighting device according to claim 1, wherein the control unit is configured to determine a length of a dead time of the two switching elements to be a first time when the driving frequency is a first frequency, and determine a length of a dead time of the two switching elements to be a second time longer than the first time when the driving frequency is a second frequency higher than the first frequency.

5. The lighting device according to claim 1, wherein the control unit is configured to skip providing the non-switching period when a current that is supplied to the solid light emitting element is larger than a predetermined value, and provide the non-switching period when a current that is supplied to the solid light emitting element is smaller than or equal to the predetermined value.

6. The lighting device according to claim 1, wherein the DC/DC converter includes a smoothing capacitor having an output part, and the control unit is configured to detect a voltage of the smoothing capacitor at a start time of the switching period, and either (i) set a length of the frequency gradual decrease period to a third time when the voltage is a first value, or (ii) set a length of the frequency gradual decrease period to a fourth time shorter than the third time when the voltage is a second value larger than the first value.

7. The lighting device according to claim 1, wherein the control unit is configured to either (i) set a length of the frequency gradual decrease period to a sixth time when the length of the non-switching period is a fifth time, or (ii) set a length of the frequency gradual decrease period to an eighth time shorter than the sixth time when the length of the non-switching period is a seventh time shorter than the fifth time.

8. The lighting device according to claim 1, wherein the control unit is configured to either (i) set an intermittent frequency that is a frequency in the intermittent driving to a third frequency when a duty ratio in the switching period is a first duty ratio, or (ii) set an intermittent frequency to a fourth frequency lower than the third frequency when the duty ratio is a second duty ratio smaller than the first duty ratio.

9. The lighting device according to claim 8, wherein the control unit is configured to adjust the intermittent frequency by changing the length of the non-switching period while maintaining the length of the switching period.

10. The lighting device according to claim 8, wherein the second duty ratio is lower than or equal to 50%.

11. The lighting device according to claim 1, wherein the solid light emitting element is at least one of an organic electro-luminescence (EL) element and a light emitting diode (LED).

12. A luminaire comprising:

the lighting device according to claim 1; and a solid light emitting element.

* * * * *